(12) United States Patent
Shirsat et al.

(10) Patent No.: US 10,781,372 B2
(45) Date of Patent: Sep. 22, 2020

(54) WATER ABSORBENT COMPOSITION

(71) Applicant: UPL LIMITED, Haldia (IN)

(72) Inventors: Rajan Ramakant Shirsat, Mumbai (IN); Jaidev Rajnikant Shroff, Mumbai (IN); Vikram Rajnikant Shroff, Mumbai (IN)

(73) Assignee: UPL LIMITED, Haldia (IN)

( * ) Notice: Subject to any disclaimer, the term of this patent is extended or adjusted under 35 U.S.C. 154(b) by 72 days.

(21) Appl. No.: 15/564,982

(22) PCT Filed: Apr. 4, 2016

(86) PCT No.: PCT/IB2016/051904
§ 371 (c)(1),
(2) Date: Oct. 6, 2017

(87) PCT Pub. No.: WO2016/162783
PCT Pub. Date: Oct. 13, 2016

(65) Prior Publication Data
US 2018/0305618 A1    Oct. 25, 2018

(30) Foreign Application Priority Data
Apr. 6, 2015 (IN) .............................. 389/KOL/2015

(51) Int. Cl.
| | | |
|---|---|---|
| *C09K 17/50* | (2006.01) |
| *C08L 3/04* | (2006.01) |
| *C09D 4/00* | (2006.01) |
| *C09K 17/40* | (2006.01) |
| *C05B 17/00* | (2006.01) |
| *C05B 7/00* | (2006.01) |
| *C09K 17/22* | (2006.01) |
| *C05G 3/60* | (2020.01) |
| *C09K 101/00* | (2006.01) |

(52) U.S. Cl.
CPC ............... *C09K 17/50* (2013.01); *C05B 7/00* (2013.01); *C05B 17/00* (2013.01); *C05G 3/60* (2020.02); *C08L 3/04* (2013.01); *C09D 4/00* (2013.01); *C09K 17/22* (2013.01); *C09K 17/40* (2013.01); *C09K 2101/00* (2013.01)

(58) Field of Classification Search
None
See application file for complete search history.

(56) References Cited

U.S. PATENT DOCUMENTS

| | | | |
|---|---|---|---|
| 8,318,306 B2* | 11/2012 | Tian ................... | A61L 15/18 428/402 |
| 2007/0163173 A1* | 7/2007 | Savich ................. | A01G 24/00 47/58.1 R |
| 2009/0191408 A1* | 7/2009 | Tian ................... | A61L 15/18 428/402 |
| 2009/0304638 A1* | 12/2009 | Yoon ................... | A61K 35/76 424/93.6 |

FOREIGN PATENT DOCUMENTS

CA          2304239       *   3/1998

* cited by examiner

*Primary Examiner* — Joseph D Anthony
(74) *Attorney, Agent, or Firm* — IP Pundit LLC

(57) ABSTRACT

A composition comprising at least one superabsorbent polymer and at least one water soluble phosphate and optionally a plant advantageous additive.

12 Claims, No Drawings

WATER ABSORBENT COMPOSITION

TECHNICAL FIELD OF THE INVENTION

The present invention relates to a composition having improved water absorbency.

BACKGROUND AND PRIOR ART

Superabsorbent polymers absorb water or fluids several times their weight. Superabsorbent polymers or SAPs improve supply of water in the soil and therefore find use in agriculture.

Various superabsorbent polymers are known in the art. Such superabsorbent polymers may be made from polyacrylamide copolymer, cross-linked carboxymethylcellulose, polyvinyl alcohol copolymers, cross-linked polyethylene oxide, starch grafted copolymer of polyacrylonitrile etc. The water absorbance of most superabsorbent polymers has been known to decrease considerably in the presence of salts. Soil incorporated superabsorbent polymers or those that are mixed with fertilizers have been known to suffer from decreased absorbance capacity due to the presence of salts in the soil or fertilizer. Studies have been carried out to study the effect of such salts such as those carried out by Daniel C. Bowman, Richard Y. Evans, and J. L. Paul., *J. Amer. Soc. Hort. Sci.* May 1990 115:382-386, Fertilizer Salts Reduce Hydration of Polyacrylamide Gels and Affect Physical Properties of Gel-amended Container Media. The paper discusses the decrease in polymer absorption capacity when mixed with salts. They observed that soluble salts dramatically affect absorption by hydrophilic polyacrylamide gels.

Agriculture requires the use of many compounds to ensure good yields and healthy crops. Most of the fertilizers and nutrients added to the soil are salts that in some way contribute to the improvement in the crops. Salts are also naturally present in the soil, which also contribute to the increased salinity of the soil. In draught prone areas and areas where water management is essential, the salinity in the soil is higher, as water required to wash these salts away is scarce. In such soils, where water is scarce or where water management is required or even where normal salts are added to the soil, addition of superabsorbent polymers may not result in the desired effect that is, increased water availability. Salts in the environment around the superabsorbent polymer decrease the capacity of the polymer to absorb and desorb water.

Specifically when mixed with soil for agricultural purposes, superabsorbent polymers are expected to perform exceptionally well by absorbing water many times the weight of the polymer. When introducing other components such as fertilizers etc., the capacity of the superabsorbent polymers to absorb water decrease considerably, naturally present salts in the soil may also contribute to a decrease in absorption capacity.

EP1740232B1 (Qin et. al) teaches the use of a combination of two materials which are then surface coated onto the superabsorbent polymer. The materials include thermoplastic materials such as polyethylene oxide, polypropylene oxide, hydroxypropyl cellulose, polyethylene imine, polyvinyl alcohol, polyethylene glycol, polyacrylate, polystyrene, polyamide etc. Applications of such material may be useful for superabsorbent polymers used in sanitary and industrial uses, but in agricultural uses, many of the additives used may not be useful, and may even hinder the flow of water from the superabsorbent polymer back into the soil.

WO2008025656 (Herfert et. al) teaches the use of polyamines to surface treat superabsorbent polymers to improve absorption. The use of polyamines is expensive and the process requires heating and cooling of the polymer gel.

WO2002060983 (Thomas et. al) teaches the use of water insoluble metal phosphates to improve absorption of superabsorbent polymers when introduced into an environment which is saline. The water insoluble phosphate confers high absorption capacity, improved liquid transport performance and faster swelling speed to the superabsorbent polymer. However, it has been observed by the present inventors that the insoluble nature of the phosphates taught in Thomas is also responsible for partially restricting the water absorptive capacity of the associated polymer. This publication also teaches the use of an water insoluble phosphate, along with a superabsorbent polymer, only in a personal care and hygiene environment of use.

Many other efforts have been made in the past to improve absorbance of superabsorbent polymers in the presence of salts. Most of these efforts have been directed to improving the water absorbance of superabsorbent polymers only in the personal hygiene products.

OBJECT OF THE INVENTION

Thus, one advantage of the present invention is in providing a composition having enhanced water absorption capacity.

Another advantage of the present invention is in providing a composition having enhanced water absorption capacity even in the presence of an ionic salt.

Yet another advantage of the present invention is in providing a composition having enhanced water absorption capacity wherein the composition is suitable for agricultural use.

Another advantage of the present invention is in providing a composition having enhanced water absorption capacity and capable of performing as a synergist to a pesticide during its agricultural use.

These and other advantages may be achieved by the invention described in any aspect or embodiment hereinafter.

SUMMARY OF THE INVENTION

A composition comprising at least one superabsorbent polymer and at least one water soluble phosphate.

A method of increasing the water absorption capacity of a superabsorbent polymer, the method comprising contacting the superabsorbent polymer with at least one water soluble phosphate.

A composition comprising at least one superabsorbent polymer, at least one water soluble phosphate and at least one plant advantageous additive.

A multi-pack agricultural product comprising:
a first container comprising at least one superabsorbent polymer;
a second container comprising at least one water soluble phosphate; and
an instruction manual instructing an user to admix the contents of said first and second container and administering the admixture to a locus.

DETAILED DESCRIPTION

It has surprisingly been found by the present inventor that, contacting a superabsorbent polymer with at least one water soluble phosphate demonstrates an increased absorbance of water, even under conditions in the soil that normally contribute to decrease in water absorbance of such superabsorbent polymers. It was further surprisingly found that this enhancement in the water absorption capacity induced due to a water soluble phosphate was unexpectedly higher than the enhancement observed due to a water insoluble phosphate, for example, taught in Thomas et al discussed above.

Without wishing to be bound by theory, it is believed that contacting a soluble phosphate with a superabsorbent polymer matrix causes the solubilized (dissolved) phosphate to ionize. The resulting ions migrate more readily into the superabsorbent polymeric core and settle into the carboxylic acid—amide network, which is responsible for water absorption. This migration of the dissolved phosphate ions into the polymeric core increases the total number of ionic moieties present in the polymeric core, consequently increasing the number of available sites for hydrogen bonding with water molecules, as well as altering the pore size of the polymeric network. The present inventors also believe that the use of a water soluble phosphate provides the following unexpected advantages: alter the total tertiary structure of the polymer to accommodate more water molecules, alter the acid to amide ratio, cause the surface crosslinking of the polymer to bind more water molecules, water soluble phosphate acts as a potential fertilizer source, and act as a potential synergist for enhancing the known efficacy of the pesticides. Naturally, these unexpected benefits could not have been conceivably achieved with a water insoluble phosphate.

Accordingly, in an aspect, the present invention provides a composition comprising at least one superabsorbent polymer and at least one water soluble phosphate.

Alternately, in another aspect, the present invention also provides a method of increasing the water absorption capacity of a superabsorbent polymer, the method comprising contacting the superabsorbent polymer with at least one water soluble phosphate.

Within the context of this specification, each term or phrase below will include the following meaning or meanings:

The terms "superabsorbent polymer" or "SAP" or "polymer gel" refer to water swellable polymers that can absorb water many times their weight in an aqueous solution. Without wishing to be bound by theory, the term superabsorbent polymers also apply to polymers that absorb water as well as de-sorb the absorbed water. The superabsorbent polymer may be selected from but not limited to water-swellable or water absorbing or water-retentive polymers such as cross-linked polymers that swell without dissolving in the presence of water, and may, absorb at least 10, 100, 1000, or more times their weight in water.

The term contacting the water soluble phosphate with the superabsorbent polymer includes, but is not limited to, the application of the water soluble phosphate onto or in the vicinity of the surface of a particle of a superabsorbent polymer.

"Water soluble phosphates" refers to those salts of phosphate that are water soluble or at least slightly soluble in water under conditions of normal temperature and pressure.

In an embodiment, the term water soluble phosphate, includes a phosphate salt, having a solubility greater than about 1 g in 100 mL of water at 25° C.

The phrases "at least one" means "one or more", "at least" followed by a numerical value means "this or a higher numerical value".

Thus, in an aspect, the present invention also provides a superabsorbent polymer whose particles are contacted with a water soluble phosphate. These particles of the superabsorbent polymer possess significantly enhanced water absorption capacity, and were found especially suited for agricultural uses.

In an embodiment, the water soluble phosphates may be water soluble alkali phosphates and may be of the general formula:

$M_aH_bP_cO_d$ where a may be 1-15, b may be 0-14, c may be 1-5 and d may be 1-15;

wherein M may be an alkali metal ion or $NH_4^+$.

In a preferred embodiment, the water soluble phosphate may be selected as comprising such exemplary alkali metal ions selected from $Li^+$, $Na^+$, $K^+$, $Rb^+$, $Cs^+$, $Fr^+$, $H^+$ and $NH_4^+$.

In yet another embodiment, the preferred water soluble phosphate may be selected from $Na^+$, $K^+$, $NH_4^+$ salts of phosphate.

In another embodiment, the preferred water soluble phosphate may be selected from water soluble-mono, di-, tri-, tetra-, and polyphosphate salts of alkali metal ions that are water soluble.

In another embodiment, the water soluble phosphate may be selected from monosodium dihydrogen phosphate, disodium hydrogen phosphate, trisodium phosphate, diammonium phosphate, monoammonium phosphate, monopotassium phosphate, potassium diphosphate and dipotassium phosphate.

In an embodiment, the amount of water soluble phosphate may be at least 0.1% based on the weight of the superabsorbent polymer. Preferably the amount of water soluble phosphate may be at least 0.1% to 50% based on the weight of the superabsorbent polymer. Preferably the amount of the water soluble phosphate may be at least 0.1-25% based on the weight of the superabsorbent polymer. Most preferably the amount of the water soluble phosphate may be at least 0.1-10% based on weight of the superabsorbent polymer.

In an embodiment, the superabsorbent polymer may be a selected from, but not limited to, copolymer of acrylamide and sodium acrylate; hydrolyzed starch-polyacrylonitrile; 2-propenenitrile homopolymer, hydrolyzed, sodium salt or poly(acrylamide co-sodium acrylate) or poly(2-propenamide-co-2-propanoic acid, sodium salt); starch-g-poly(2propenamide-co-2-propanoic acid, mixed sodium and aluminum salts); starch-g-poly(2-propenamide-co-2-propanoic acid, potassium salt); poly(2-propenamide-co-2-propanoic acid, sodium salt); poly-2-propanoic acid, sodium salt; starch-gpoly(acrylonitrile) or poly(2-propenamide-co-sodium acrylate); starch/acrylonitrile copolymer; crosslinked copolymers of acrylamide and sodium acrylate; acrylamide/ sodium polyacrylate crosslinked polymers; anionic polyacrylamide; starch grafted sodium polyacrylates; acrylic acid polymers, sodium salt; crosslinked potassium polyacrylate/polyacrylamide copolymers; sodium polyacrylate; superabsorbent polymer laminates and composites; partial sodium salt of crosslinked polypropenoic acid; potassium polyacrylate, lightly crosslinked; sodium polyacrylate, lightly crosslinked; sodium polyacrylates; poly(sodiumacrylate) homopolymer; polyacrylamide polymers, carrageenan, agar, alginic acid, guar gums and its derivatives, and gellan gum; Specific superabsorbent polymers include crosslinked copolymer of acrylamide and potassium acrylate.

In a preferred embodiment, the superabsorbent polymer may be starch-g-poly (2-propenamide-co-2-propenoic acid) potassium salt or crosslinked polyacrylic acid potassium salt.

Thus, in an embodiment, the present invention provides a composition comprising at least one superabsorbent polymer and at least one water soluble alkali phosphate having the general formula $M_aH_bP_cO_d$ where a can be 1-15, b can be 0-14, c can be 1-5 and d can be 1-12 and wherein M may be an alkali metal ion or an $NH^{4+}$.

In another embodiment, the present invention provides a composition comprising starch-g-poly (2-propenamide-co-2-propenoic acid) potassium salt polymer and at least one water soluble alkali phosphate having the general formula $M_aH_bP_cO_d$ where a can be 1-15, b can be 0-14, c can be 1-5 and d can be 1-12 and wherein M may be an alkali metal ion or an $NH^{4+}$.

In another embodiment, the present invention provides a composition comprising starch-g-poly (2-propenamide-co-2-propenoic acid) potassium salt polymer and at least one water soluble alkali phosphate having the general formula $M_aH_bP_cO_d$ where a can be 1-15, b can be 0-14, c can be 1-5 and d can be 1-12 and wherein M may be an alkali metal ion or an $NH^{4+}$.

In a particular embodiment, the present invention provides a composition comprising starch-g-poly (2-propenamide-co-2-propenoic acid) potassium salt polymer and trisodium phosphate.

It has been further found by the present inventors that the water soluble phosphate of the present invention is simultaneously also a potential synergist for enhancing the known efficacy of the pesticides when the two are used in combination.

Therefore, in this aspect, the present invention provides a composition comprising at least one superabsorbent polymer, at least one water soluble phosphate and at least one plant advantageous additive.

In an embodiment, the plant advantageous additive is selected from fertilizers, mycorrhiza, micronutrients, acaricides, algicides, antifeedants, avicides, bactericides, bird repellents, chemosterilants, fungicides, herbicide safeners, herbicides, insect attractants, insect repellents, insecticides, mammal repellents, mating disruptors, molluscicides, nematicides, plant activators, plant-growth regulators, rodenticides, synergists, virucides, derivatives thereof, biological control agents and mixtures thereof.

In an embodiment, the fertilizer may be selected from organic and inorganic fertilizers such as those selected from but not limited to urea, NPK, nitrogen based fertilizers, phosphate, calcium, potassium, magnesium, sulfur, copper, iron, manganese, molybdenum, zinc, nickel, cobalt, boron and their salts and derivatives. Exemplary organic fertilizer may be selected from peat, limestone, rock phosphate, blood meal, bone meal, compost, humic acid, seaweed extracts, digested proteins, fish meal, feather meal, corn meal, alfalfa meal etc.

In a preferred embodiment, the fertilizer may be an inorganic fertilizer selected from NPK, derivatives of potassium, zinc, phosphate such as those selected from but not limited to potassium fertilizers such as potassium carbonate, potassium chloride (also known as muriate of potash), potassium sulfate, potassium nitrate, sulfate of potash magnesia; zinc fertilizers such as those selected from zinc sulfate, zinc oxide, zinc ammonia complex; phosphate fertilizer such as Di-ammonium phosphate, Monoammonium phosphate, Ammonium polyphosphate, Triple superphosphate or mixtures thereof.

In an embodiment, the fertilizer may be an organic fertilizer selected from urea, rock potash seaweed extract, compost, humic acid, alfalfa meal, corn meal, and mixtures thereof.

In an embodiment, the present invention may provide a composition comprising at least one superabsorbent polymer, at least one water soluble phosphate and a fertilizer mix of organic and inorganic fertilizers.

In any aspect or embodiment described hereinafter, the term "composition" shall be intended to include both the compositions formed at the time of, or immediately before, the intended application or a pre-formulated composition.

In an aspect, the composition may additionally comprise mycorrhiza, micronutrients including but not limited to amino acids and other agronomically advantageous plant additives thereof.

Further additives such as inert fillers, binding agents, surfactants, dispersing agents and the like may be added to the composition of the present invention.

In an embodiment, the inert fillers and/or binding agents may be selected from but not limited to kaolin, sucrose, lactose, mineral earths and clays such as bentonite, perlite, talc, kaolin, aluminum silicate, diatomaceous earth, attapulgite, clay, barium sulfate, mica, zeolites, calcium carbonate, fused sodium potassium, precipitated silica, precipitated silicates, aluminum silicate, sodium citrate, potassium citrate and magnesium citrate.

The improved composition of the present invention may be applied in granular form, or in a powder form or in a liquid form or in any other agrochemically acceptable form of delivery.

In a preferred embodiment, the improved composition of the present invention is in the form of granules.

The composition of the present invention may be applied to plant, root, seed, or seedling by various methods, including, but not limited to dipping the plant, root, seed, or seedling into the superabsorbent polymer composition, a slurry of the superabsorbent polymer composition, or a paste including the superabsorbent polymer composition of the invention; mixing another plant growth media with the superabsorbent polymer composition and later planting a plant, root, seed, or seedling into the plant growth media comprising the superabsorbent polymer composition of the invention; or forming a slurry of the superabsorbent polymer composition that is applied directly to the growing substrate.

In another aspect, the present invention provides a process for the preparation of a composition. The process comprises mixing a superabsorbent polymer and a water soluble phosphate.

The word "mixing" is to be taken in the broadest possible sense wherein it may imply that the superabsorbent polymer may be added to the water soluble phosphate, or to a solution of the water soluble phosphate or by contacting a salt forming solution such that a water soluble phosphate may be formed when contacted within the superabsorbent polymer.

In an embodiment, the superabsorbent polymer may be selected from but not limited to copolymer of acrylamide and sodium acrylate; hydrolyzed starch-polyacrylonitrile; 2-propenenitrile homopolymer; hydrolyzed sodium salt of poly(acrylamide co-sodium acrylate) or poly(2-propenamide-co-2-propanoic acid, sodium salt); starch-g-poly(2propenamide-co-2-propanoic acid, mixed sodium and aluminum salts); starch-g-poly(2-propenamide-co-2-propanoic acid, potassium salt); poly(2-propenamide-co-2-propanoic acid, sodium salt); poly-2-propanoic acid, sodium salt; starch-g-poly(acrylonitrile) or poly(2-propenamide-co-sodium acrylate); starch/acrylonitrile copolymer; crosslinked copolymers of acrylamide and sodium acrylate; acrylamide/ sodium polyacrylate crosslinked polymers; anionic polyacrylamide; starch grafted sodium polyacrylates; acrylic acid polymers, sodium salt; crosslinked potassium polyacrylate/polyacrylamide copolymers; sodium polyacrylate; superabsorbent polymer laminates and composites; partial sodium salt of crosslinked polypropenoic acid; potassium polyacrylate, lightly crosslinked; sodium polyacrylate, lightly crosslinked; sodium polyacrylates; poly(sodiumacrylate) homopolymer; polyacrylamide polymers, carrageenan, agar, alginic acid, guar gums and its derivatives, gellan gum and crosslinked copolymer of acrylamide & potassium acrylate.

In a preferred embodiment, the superabsorbent polymer may be starch-g-poly (2-propenamide-co-2-propenoic acid) potassium salt or crosslinked polyacrylic acid potassium salt.

In an embodiment, the amount water soluble phosphate may be at least 0.1% of the total weight of the superabsorbent polymer. Preferably the amount of water soluble phosphate may be at least 0.1% to 20% of the total weight of the superabsorbent polymer. More preferably the amount of water soluble phosphate may be at least 0.1% to 10% of the total weight of the superabsorbent polymer.

In another embodiment, the present invention provides a process for preparing a granular composition, said process comprising:
 a. admixing an organic fertilizer or an inorganic fertilizer with at least a binding agent;
 b. adding a superabsorbent polymer and homogenizing the mixture;
 c. adding at least one water soluble phosphate to the mixture;
 d. adding water to the mixture of step (c) to form a dough;
 e. granulating the dough; and
 f. drying the granules of step (e).

In an embodiment, the granules may be formed by process of extrusion, or pan granulation, or fluid-bed granulation.

In an embodiment, the superabsorbent polymer may be present within the compositions of the invention in the range of at least 0.1 to up to 100 grams per 100 g by weight of the composition. In a preferred embodiment, the quantity of superabsorbent polymer may be in the range of at least 0.1 to 50 grams per 100 g by weight of the composition. In a preferred embodiment, the quantity of superabsorbent polymer may be in the range of at least 0.1 to 10 gm per 100 g by weight of the composition.

In another aspect, the present invention provides a method of improving the quality of plants and/or soil comprising contacting the soil with a composition comprising a superabsorbent polymer and a water soluble phosphate.

In an embodiment, the method comprises applying the superabsorbent polymer composition of the invention into the root zone of the plants.

In an embodiment, the present invention provides a method for improvement of soil by application of the superabsorbent polymer composition of the present invention.

In an embodiment, the present invention provides a method for improving the yield of a crop by applying the superabsorbent polymer composition of the invention to plant propagation material selected from, but not limited to seeds, plant propagules such as suckers, corms, bulbs, fruit, tubers, grains, cuttings and cut shoots.

In an embodiment, the present invention provides a method for improving the yield of a crop by applying the superabsorbent polymer composition of the invention to roots of the plant.

In another embodiment, the present invention provides a method for improving the yield of a crop by applying the superabsorbent polymer composition of the invention to foliar parts of the plant.

In any aspect or embodiment described hereinabove, the term "superabsorbent polymer composition of the invention" shall be understood to include a composition comprising at least one superabsorbent polymer and at least one water soluble phosphate or a composition comprising at least one superabsorbent polymer, at least one water soluble phosphate and at least one plant advantageous additive.

In an aspect, the superabsorbent polymer, the water soluble phosphate and optionally the plant advantageous additive may be packaged as a kit-of-parts which facilitates the addition of the superabsorbent polymer, the water soluble phosphate and optionally the plant advantageous additive at the time of application.

Therefore, in this aspect, the present invention provides a multi-pack agricultural product comprising:
a first container comprising at least one superabsorbent polymer;
a second container comprising at least one water soluble phosphate;
optionally a third container comprising at least one plant advantageous additive; and an instruction manual instructing an user to admix the contents of said first and second container and administering the admixture to a locus.

In another embodiment, the present invention can provide a multi-pack product comprising:
(a) a first container comprising at least one superabsorbent polymer; and
(b) a second container comprising at least one water soluble phosphate.

In this embodiment, the multi-pack superabsorbent polymer product can further comprise an instruction manual instructing the user to admix the contents of said first and second containers and administering the admixture to the locus.

In an embodiment, the multi-pack product may comprise a fertilizer or fertilizer blends or blends of fertilizer with other agronomically advantageous plant additives.

In an embodiment, the present invention can provide a multi-pack superabsorbent polymer product for application at a locus, said product comprising:
(a) a first container comprising superabsorbent polymer or a composition thereof;
(b) a second container comprising at least one water soluble alkali phosphate having the general formula $M_aH_bP_cO_d$ where a can be 1-15, b can be 0-14, c can be 1-5 and d can be 1-12 and wherein M may be an alkali metal ion or an $NH^{4+}$.

In this embodiment, the composition of superabsorbent polymer may contain the superabsorbent polymer combined with fertilizers, micronutrients and other agronomically advantageous plant additives.

In an embodiment, the present invention can provide a single pack product comprising, superabsorbent polymer and trisodium phosphate.

In an aspect, the present invention provides a method of using a water soluble phosphate as a means to improve absorbance of a superabsorbent polymer.

Thus, in an embodiment, the present invention provides a method of enhancing the absorbance of a superabsorbent polymer, the method comprising contacting a water soluble phosphate with a superabsorbent polymer, wherein the water soluble phosphate has the general formula $M_aH_bP_cO_d$ where a can be 1-15, b can be 0-14, c can be 1-5 and d can be 1-12 and wherein M may be an alkali metal ion or an $NH^{4+}$.

In a preferred embodiment, the water soluble phosphate may be the phosphate salt of ions selected from $Li^+$, $Na^+$, $K^+$, $Rb^+$, $Cs^+$, $Fr^+$, $H^+$ and $NH_4^+$.

In another embodiment, the water soluble phosphate may be selected from $Na^+$, $K^+$ or $NH_4^+$ salts of phosphate.

Preferred water soluble phosphate may be selected from water soluble-mono, di-, tri-, tetra-, and polyphosphate salts of alkali metal and ammonium ions that are water soluble. The most preferred may be selected from monosodium phosphate, disodium phosphate, trisodium phosphate, diammonium phosphate, monoammonium phosphate, monopotassium phosphate, potassium diphosphate or dipotassium phosphate.

The advantages offered by the present invention will be more apparent from the examples set forth herein below. These examples are provided merely as illustrations of the invention and are not intended to be construed as a limitation thereof.

EXAMPLES

Example 1

Superabsorbent polymers were contacted with various substances that are conventionally known in the art to increase absorbance. These were compared to superabsorbent polymers contacted with water soluble phosphates. Table 1 compares the results:

TABLE 1

| Formulation | Water absorbed in 24 hrs | Wt. of polymer in formulation | Wt. of water absorbed by per gm of polymer in 24 hrs |
|---|---|---|---|
| SAP plus fertilizer with tallow amine surfactant | 17.652 | 0.386 | 56.17 |
| SAP plus fertilizer with calcium carbonate | 3.782 | 0.384 | 64.35 |
| SAP plus fertilizer with water soluble phosphate | 21.205 | 0.172 | 123.60 |
| SAP plus fertilizer without water soluble phosphate | 13.935 | 0.165 | 84.39 |
| SAP As such | 64.905 | 0.538 | 120.60 |

The superabsorbent polymer used for the experiment was the starch graft polymer starch-g-poly (2-propenamide-co-2-propenoic acid) potassium salt. The water soluble phosphate used for the experiment was tri sodium phosphate.

It was concluded that superabsorbent polymers when mixed with fertilizer showed markedly decreased absorbance. This decrease in water absorbance could only be compensated by the addition of a water soluble phosphate. Compared to known methods of increased absorbance exemplified by calcium carbonate and tallow amine surfactant, superabsorbent polymers treated with water soluble phosphates and mixed with fertilizers demonstrated improved absorbance.

Example 2

| Sr. No. | Ingredient | Quantity in Kg. |
|---|---|---|
| 1 | starch-g-poly (2-propenamide-co-2-propenoic acid) potassium salt | 32 |
| 2 | PPT silica | 19.2 |
| 3 | Trisodium phosphate | 4 |
| 4 | Kaolin | 44.8 |
| | Total | 100 |

Process:
Precipitated silica and kaolin were mixed to which the superabsorbent polymer trisodium phosphate was added. A required quantity of distilled water was added while mixing to foam dough, this dough was extruded by using extruder. The extruded granules were dried in Fluid bed drier. The water absorbance of the prepared composition was measured as shown in Table 1.

Example 3

| Sr. No. | Ingredient\Formulation | Quantity |
|---|---|---|
| 1 | starch-g-poly (2-propenamide-co-2-propenoic acid) potassium salt | 6.4 |
| 2 | Trisodium phosphate | 4 |
| 3 | Kaolin | 89.60 |
| | Total | 100 |

Process:
The superabsorbent polymer, kaolin and trisodium phosphate were mixed while continuous blending. A quantity of distilled water was added while mixing to form dough of the mixture. This dough was extruded by using extruder. The extruded granules were dried in Fluid bed drier.

Example 4

| Sr. No. | Ingredient\Formulation | Quantity |
|---|---|---|
| 1 | starch-g-poly (2-propenamide-co-2-propenoic acid) potassium salt | 72 |
| 2 | Trisodium phosphate | 28 |
| | Total | 100 |

Process:
The superabsorbent polymer was mixed with ground trisodium phosphate on pan granulator. A quantity of distilled water was sprayed slowly on mixture in pan granulator while mixing. The wet granules formed on pan granulator were dried in fluid bed dryer.

Example 5

Various water insoluble and water soluble phosphates were contacted with superabsorbent polymer and the absorbance in each case was studied. Table 2 compares the results:

| Salt used in formulation | Water Soluble/ Insoluble Salt | Water absorption per gram of Superabsorbent polymer. |
|---|---|---|
| SAP + fertilizer without water soluble phosphate. | . . . | 61.03 |
| SAP + fertilizer + Tri sodium phosphate | Water Soluble | 142.11 |
| SAP + fertilizer + Potassium phosphate | Water Soluble | 129.73 |
| SAP + fertilizer + Sodium di-hydrogen Phosphate | Water Soluble | 118.52 |
| SAP + fertilizer + Di-ammonium Phosphate | Water Soluble | 124.23 |
| SAP + fertilizer + Zinc Phosphate | Water Insoluble | 89.52 |
| SAP + fertilizer + Magnesium Phosphate | Water Insoluble | 74.40 |
| SAP + fertilizer + Single super phosphate | Water Insoluble | 80.33 |

The superabsorbent polymer used in the experiment was starch-g-poly (2-propenamide-co-2-propenoic acid) potassium salt.

It was concluded that superabsorbent polymers when mixed with water insoluble phosphates showed a marked decreased in absorbance, as compared to water superabsorbent polymers that were mixed with water soluble phosphates. Compared to known methods of increased absorbance exemplified by water insoluble phosphates, water soluble phosphates when mixed with superabsorbent polymers and fertilizers demonstrated improved absorbance.

The invention claimed is:

1. A composition comprising:
(i) at least one superabsorbent polymer, and
(ii) at least one water soluble phosphate in an amount of 0.1% to 25% of the total weight of the at least one superabsorbent polymer,
wherein the at least one water soluble phosphate is selected from the group consisting of monosodium phosphate, disodium phosphate, trisodium phosphate, rock phosphate, monopotassium phosphate, potassium diphosphate, and dipotassium phosphate.

2. The composition according to claim 1, wherein the composition further comprises at least one plant advantageous additive.

3. The composition according to claim 1, wherein the superabsorbent polymer is selected from the group consisting of copolymer of acrylamide and sodium acrylate; hydrolyzed starch-polyacrylonitrile; 2-propenenitrile homopolymer, hydrolyzed, sodium salt or poly(acrylamide co-sodium acrylate) or poly(2-propenamide-co-2-propanoic acid, sodium salt); starch-g-poly(2propenamide-co-2-propanoic acid, mixed sodium and aluminum salts); starch-g-poly(2-propenamide-co-2-propanoic acid, potassium salt); poly(2-propenamide-co-2-propanoic acid, sodium salt); poly-2-propanoic acid, sodium salt; starch-gpoly(acrylonitrile) or poly (2-propenamide-co-sodium acrylate); starch/acrylonitrite copolymer; crosslinked copolymers of acrylamide and sodium acrylate; acrylamide/sodium polyacrylate crosslinked polymers; anionic polyacrylamide; starch grafted sodium polyacrylates; acrylic acid polymers, sodium salt; crosslinked potassium polyacrylate/polyacrylamide copolymers; sodium polyacrylate; superabsorbent polymer laminates and composites; partial sodium salt of crosslinked polypropenoic acid; potassium polyacrylate, lightly crosslinked; sodium polyacrylate, lightly crosslinked; sodium polyacrylates; poly(sodiumacrylate) homopolymer;
polyacrylamide polymers, carrageenan, agar, alginic acid, guar gums and its derivatives, and gellan gum; crosslinked copolymer of acrylamide and potassium acrylate.

4. The composition according to claim 1, wherein said superabsorbent polymer is starch-g-poly (2-propenamide-co-2-propenoic acid) potassium salt or crosslinked polyacrylic acid potassium salt.

5. The composition according to claim 1, wherein the water soluble phosphate is trisodium phosphate.

6. The composition as claimed in claim 2, wherein the plant advantageous additive is selected from fertilizers, mycorrhiza, micronutrients, acaricides, algicides, antifeedants, avicides, bactericides, bird repellents, chemosterilants, fungicides, herbicide safeners, herbicides, insect attractants, insect repellents, insecticides, mammal repellents, mating disruptors, molluscicides, nematicides, plant activators, plant-growth regulators, rodenticides, synergists, virucides, derivatives thereof, biological control agents and mixtures thereof.

7. The composition as claimed in claim 2, wherein the plant advantageous additive is a fertilizer selected from urea, NPK, nitrogen based fertilizers, phosphate, calcium, potassium, magnesium, sulfur, copper, iron, manganese, molybdenum, zinc, nickel, cobalt, boron and their salts and derivatives, peat, limestone, rock phosphate, Blood meal, bone meal, compost, humic acid, amino acids, seaweed extracts, digested proteins, fish meal, feather meal, potassium carbonate, potassium chloride, potassium sulfate, potassium nitrate, sulfate of potash magnesia; zinc sulfate, zinc oxide, zinc ammonia complex; Di-ammonium phosphate, Mono-ammonium phosphate, Ammonium polyphosphate, Triple superphosphate or mixtures thereof.

8. The composition according to claim 1, further comprising at least one pesticide.

9. A method of increasing water absorption capacity of a superabsorbent polymer, the method comprising contacting the superabsorbent polymer with at least one water soluble phosphate in an amount of 0.1% to 25% of the total weight of the at least one superabsorbent polymer;
wherein the at least one water soluble phosphate is selected from the group consisting of monosodium phosphate, disodium phosphate, trisodium phosphate, rock phosphate, monopotassium phosphate, potassium diphosphate, and dipotassium phosphate.

10. The method according to claim 9, wherein said superabsorbent polymer is starch-g-poly (2-propenamide-co-2-propenoic acid) potassium salt or crosslinked polyacrylic acid potassium salt and said water soluble phosphate is trisodium phosphate.

11. The composition according to claim 1, wherein the at least one water soluble phosphate is in an amount of 0.1% to 20% of the total weight of the at least one superabsorbent polymer.

12. The composition according to claim 1, wherein the at least one water soluble phosphate is in an amount of 0.1% to 10% of the total weight of the at least one superabsorbent polymer.

* * * * *